(12) United States Patent
Wood et al.

(10) Patent No.: US 11,702,076 B2
(45) Date of Patent: Jul. 18, 2023

(54) CARGO TRAILER SENSOR ASSEMBLY

(71) Applicant: UATC, LLC, Mountain View, CA (US)

(72) Inventors: Matthew Shaw Wood, Pittsburgh, PA (US); Nancy Yung-Hui Sun, San Francisco, CA (US); Zac Vawter, Sunnyvale, CA (US)

(73) Assignee: UATC, LLC, Mountain View, CA (US)

( * ) Notice: Subject to any disclaimer, the term of this patent is extended or adjusted under 35 U.S.C. 154(b) by 57 days.

(21) Appl. No.: 17/365,453

(22) Filed: Jul. 1, 2021

(65) Prior Publication Data
US 2021/0323554 A1 Oct. 21, 2021

Related U.S. Application Data

(63) Continuation of application No. 15/790,329, filed on Oct. 23, 2017, now Pat. No. 11,052,913.

(51) Int. Cl.
| | |
|---|---|
| *G05D 1/02* | (2020.01) |
| *B60Q 1/34* | (2006.01) |
| *B60Q 1/44* | (2006.01) |
| *G01S 17/931* | (2020.01) |
| *B60W 30/18* | (2012.01) |
| *H04W 4/80* | (2018.01) |

(52) U.S. Cl.
CPC ............. *B60W 30/18* (2013.01); *B60Q 1/346* (2013.01); *B60Q 1/44* (2013.01); *G01S 17/931* (2020.01); *G05D 1/0225* (2013.01); *G05D 1/0246* (2013.01); *G05D 1/0248* (2013.01); *B60W 2420/42* (2013.01); *B60W 2420/52* (2013.01); *B60W 2556/65* (2020.02); *B60W 2710/18* (2013.01); *B60W 2710/20* (2013.01); *B60W 2710/30* (2013.01); *B60W 2720/106* (2013.01); *G05D 2201/0213* (2013.01); *H04W 4/80* (2018.02)

(58) Field of Classification Search
CPC ............. B60W 30/18; B60W 2420/42; B60W 2420/52; B60W 2556/65; B60W 2710/18; B60W 2710/20; B60W 2710/30; B60W 2720/106; B60Q 1/346; B60Q 1/44; G01S 17/931; G01S 2013/9323; G01S 2013/9324; G01S 7/4813; G05D 1/0225; G05D 1/0246; G05D 1/0248; G05D 2201/0213; H04W 4/80; H04W 4/38
See application file for complete search history.

(56) References Cited

U.S. PATENT DOCUMENTS

| | | |
|---|---|---|
| 6,509,832 B1 | 1/2003 | Bauer |
| 6,587,573 B1 | 7/2003 | Stam |

(Continued)

*Primary Examiner* — Jeff A Burke
*Assistant Examiner* — Kyle T Johnson
(74) *Attorney, Agent, or Firm* — Dority & Manning, P.A.

(57) ABSTRACT

A sensor assembly can include a housing that includes a view pane and a mounting feature configured to replace a trailer light of a cargo trailer of a semi-trailer truck. The sensor assembly can also include a lighting element mounted within the housing to selectively generate light, and a sensor mounted within the housing and having a field of view through the view pane. The sensor assembly can also include a communication interface configured to transmit sensor data from the sensor to a control system of the self-driving tractor.

20 Claims, 8 Drawing Sheets

(56) References Cited

U.S. PATENT DOCUMENTS

| | | | |
|---|---|---|---|
| 8,120,652 B2 | 2/2012 | Bechtel | |
| 8,909,426 B2 | 12/2014 | Rhode | |
| 9,511,711 B2* | 12/2016 | Petrillo | B60R 1/00 |
| 9,708,000 B2 | 7/2017 | Hafner | |
| 10,222,798 B1 | 3/2019 | Brady | |
| 10,259,389 B2* | 4/2019 | Himi | B60Q 9/008 |
| 10,424,204 B1 | 9/2019 | Han | |
| 10,493,622 B2* | 12/2019 | Sweeney | B60Q 1/50 |
| 10,496,101 B2 | 12/2019 | Ghneim | |
| 11,052,913 B2* | 7/2021 | Wood | B60W 30/18 |
| 2005/0046696 A1 | 3/2005 | Lang | |
| 2005/0192727 A1 | 9/2005 | Shostak | |
| 2005/0195383 A1* | 9/2005 | Breed | B60N 2/0232 356/28 |
| 2005/0278098 A1 | 12/2005 | Breed | |
| 2006/0012894 A1* | 1/2006 | Sharma | B60R 1/025 359/843 |
| 2010/0198491 A1 | 8/2010 | Mays | |
| 2013/0041576 A1 | 2/2013 | Switkes | |
| 2013/0096777 A1* | 4/2013 | Schofield | B60Q 1/143 348/148 |
| 2014/0218529 A1 | 8/2014 | Mahmoud | |
| 2015/0151725 A1 | 6/2015 | Clarke | |
| 2016/0258591 A1 | 9/2016 | Salter | |
| 2016/0318516 A1 | 11/2016 | Tuukkanen | |
| 2017/0217368 A1 | 8/2017 | Lewis | |
| 2017/0323540 A1 | 11/2017 | Boykin | |
| 2017/0341611 A1 | 11/2017 | Baker | |
| 2018/0099712 A1* | 4/2018 | Bean | G08B 13/126 |
| 2018/0227729 A1 | 8/2018 | Bai | |
| 2018/0304836 A1 | 10/2018 | Decia | |
| 2018/0372875 A1 | 12/2018 | Juelsgaard | |
| 2019/0061817 A1 | 2/2019 | Mattern | |
| 2019/0064835 A1 | 2/2019 | Hoofard | |
| 2019/0118814 A1 | 4/2019 | Wood | |
| 2019/0187706 A1 | 6/2019 | Zhou | |
| 2019/0187716 A1 | 6/2019 | Cantrell | |
| 2019/0222652 A1* | 7/2019 | Graefe | H04L 67/12 |
| 2019/0367105 A1 | 12/2019 | Grossman | |
| 2020/0094734 A1* | 3/2020 | King | B60Q 1/28 |
| 2020/0137535 A1 | 4/2020 | Hoffner | H04W 4/90 |
| 2021/0179025 A1* | 6/2021 | Li | G03B 17/08 |

\* cited by examiner

CARGO TRAILER SENSOR ASSEMBLY

PRIORITY CLAIM

This application is a continuation of U.S. patent application Ser. No. 15/790,329 filed on Oct. 23, 2017, which is hereby incorporated by reference herein in its entirety.

BACKGROUND

Semi-trailer trucks typically include a tractor coupled to a cargo trailer, which can vary in type and dimensions. Knowledge of the length, width, and height of tractor and cargo trailer combinations can enable skilled drivers to safely maneuver semi-trailer trucks in most scenarios. However, significant risks persist due to large blind spots in several areas surrounding the tractor and cargo trailer. Furthermore, the cargo trailer of a semi-trailer truck can be more than fifteen meters in length, which can significantly complicate low speed maneuvers, such as tight turns and docking maneuvers. Despite instituted public safety measures, such as the Federal Motor Carrier Safety Administration's "No Zone" campaign, the risks to surrounding vehicles and pedestrians remain persistently high due to the large blind spots and complex low speed maneuvering of semi-trailer trucks.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
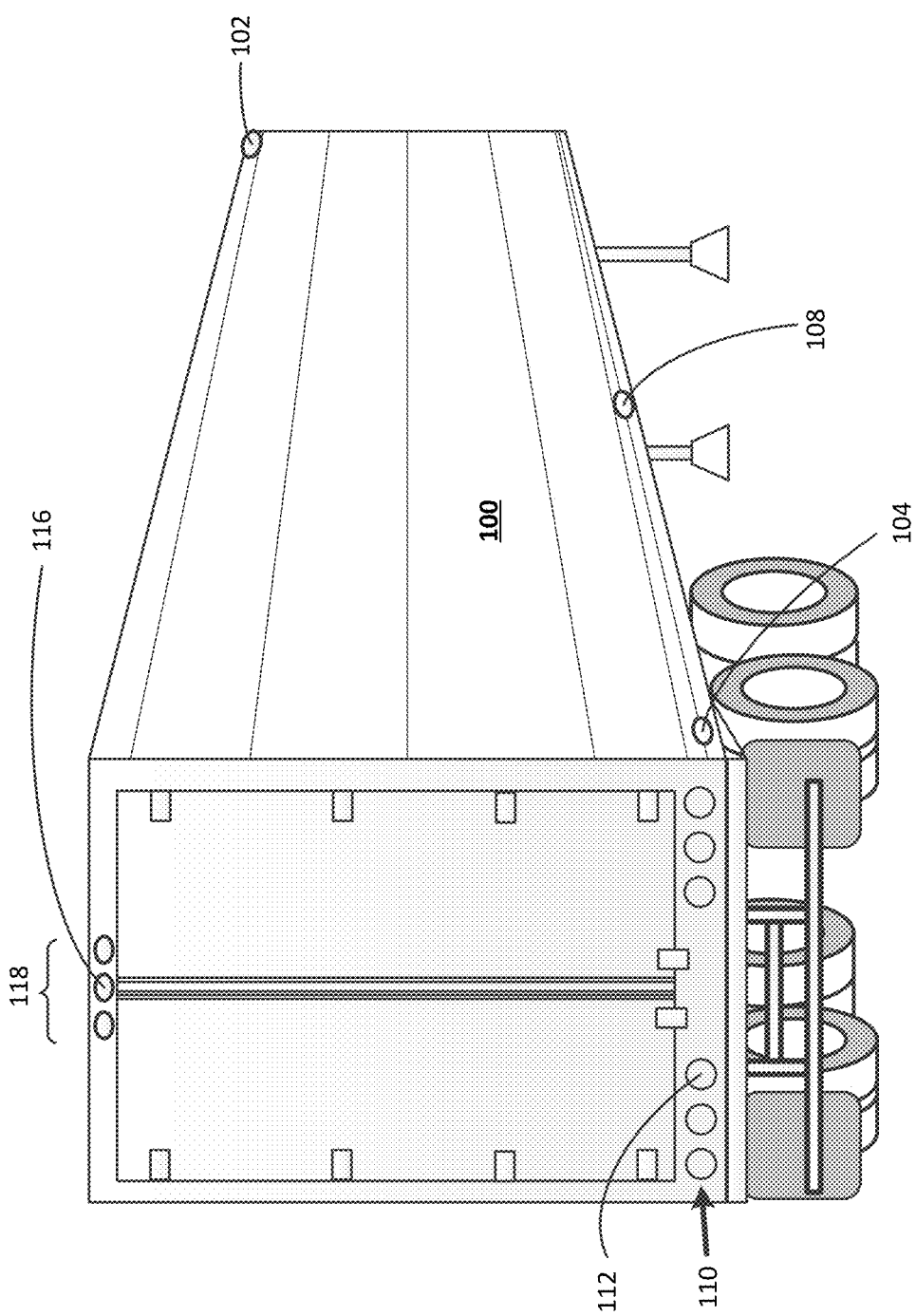
FIG. 1A illustrates a cargo trailer including a number of sensor assemblies, according to various embodiments.

Various embodiments of sensor assemblies are described herein to aid the autonomous vehicle control system of a (partially or fully) self-driving tractor of a semi-trailer truck. The self-driving tractor can include sensors mounted in one or more sensor arrays on the exterior of the self-driving tractor, such as monocular or stereo cameras, LIDAR sensors, proximity sensors, infrared sensors, sonar sensors, and the like. The control system of the self-driving tractor can include processing resources, such as field programmable gate arrays and CPUs, that couple to operate the various control mechanisms of the self-driving tractor. These control mechanisms can include the tractor's acceleration, braking, and steering systems, as well as the various signaling, shifting, and lighting systems. The self-driving tractor can also include a fifth wheel couplable to the kingpin of a cargo trailer.

The National Highway Traffic Safety Administration (NHTSA) has established a set of federal requirements for lighting equipment and the location of lighting elements for cargo trailers. For example, cargo trailers are required to include a minimum of two tail lamps, two stop lamps, two rear turn signal lamps, a license plate lamp, two rear side marker lamps, and two front side marker lamps. For cargo trailers that are longer than nine meters, additional intermediate side marker lamps are required. Additional clearance lamps and/or identification lamps are required for certain trailers to indicate the trailer dimensions, bumper clearance, cargo identifier (e.g., for hazardous material), and the like. Power is typically provided to these various lamps via a bus connector to the tractor, such as a multi-pin round connector.

Sensor assemblies described herein can be configured to replace one or more lamps of the cargo trailer. Each sensor assembly can include a housing that can comprise a view pane and a mounting feature configured to replace a trailer lamp assembly of a cargo trailer. The sensor assembly can include a lighting element mounted within the housing to selectively generate light, and a sensor mounted within the housing and having a field of view through the view pane. In various examples, the sensor assembly can further include a communication interface configured to transmit sensor data from the sensor to the control system of the self-driving tractor unit.

In certain implementations, the communication interface of the sensor assembly can comprise a wireless communication module to wirelessly transmit the sensor data to the control system of the self-driving tractor unit. In variations, the communication interface can comprise a wired interface that includes a plurality of pins. The plurality of pins can include a power pin receiving power to activate the lighting element(s), and a data pin to transmit the sensor data to the control system of the self-driving tractor unit. In some examples, the wired interface can couple to the self-driving tractor unit via the multi-pin trailer bus connector.

According to various embodiments, the sensor of the sensor assembly can comprise a camera, such as a monocular camera or stereo camera. In variations, the sensor can comprise a LIDAR sensor. The housing can further include a lens, separate from the view pane, and through which light from the lighting elements can be transmitted. As described herein, the housing of the sensor assembly can be configured to replace a lamp assembly of the cargo trailer, such as a turn signal assembly, a brake lamp assembly, a tail light assembly, a clearance indicator lamp assembly, or the side marker lamp assemblies. The mounting feature can comprise a flush mount, hang mount that hangs from an underside of the cargo trailer, or a pedestal mount that replaces a pedestal signal of the cargo trailer.

In certain examples, the sensor assembly can further include a controller that selectively actuates the sensor and the lighting element(s). Additionally, the communication interface of the sensor assembly can also be configured to receive illumination signals from the control system of the self-driving tractor, and in response, the controller can actuate the lighting element to be illuminated based on the illumination signals. The communication interface can also be configured to receive sensor activation signals from the control system of the self-driving tractor. In response to the sensor activation signals, the controller can selectively activate the sensor. For example, the sensor of a side mounted sensor assembly can be selectively activated when the self-driving tractor performs a turn or lane change. As another example, the sensor of a rear mounted sensor assembly can be selectively activated when a reverse gear is engaged by the control system of the self-driving tractor. As described herein, these selective sensor activation signals can be transmitted to the communication interfaces of the sensor assemblies wirelessly or through the multi-pin bus connector (e.g., via a two-way data pin).

Among other benefits, the examples described herein achieve a technical effect of improving safety in the autonomous operation of semi-trailer trucks by significantly reducing or eliminating cargo trailer blind spots while also fulfilling the lighting requirements of cargo trailers. The sensor assembly embodiments described herein can be installed to replace one or more existing lamp assemblies of a current cargo trailer. In some aspects, the sensor assembly embodiments can further leverage the electrical wiring of cargo trailers to supply power to sensors, lighting elements, and/or communications modules and receive data communications from the sensors of the sensor assembly. Sensor data from the sensor assemblies can be transmitted to the control system of the self-driving tractor, significantly reducing or eliminating cargo trailer blind spots.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic. An action performed automatically, as used herein, means the action is performed without necessarily requiring human intervention.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In one embodiment, a software module is implemented with a computer program product including a computer-readable non-transitory medium containing computer program code, which can be executed by a computer processor for performing any or all of the steps, operations, or processes described. As such, one or more general purpose processors coupled to the computer-readable medium correspond to a special purpose processor system for performing the steps, operations, or processes described herein. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of a self-driving vehicle. A self-driving vehicle refers to a vehicle that is operated in a state of automation with respect to steering and propulsion. Different levels of autonomy may exist with respect to self-driving vehicles. For example, some vehicles may enable automation in limited scenarios, such as on highways, provided that drivers are present in the vehicle. More advanced self-driving vehicles can drive without any human assistance from within or external to the vehicle.

Example Cargo Trailer

FIG. 1A illustrates a cargo trailer 100 including a number of sensor assemblies, according to various embodiments. The cargo trailer 100 can include a kingpin (not shown) that couples the cargo trailer to the fifth wheel of a tractor. In various examples, the cargo trailer 100 can comprise a standard box trailer for common eighteen-wheeler trucks. However, the cargo trailer 100 can also comprise any type of trailer that couples to the fifth wheel or trailer hitch of a tractor, and can carry any type of cargo. For example, the cargo trailer 100 can comprise a car-carrier trailer, a flatbed trailer, a tanker trailer, a dump trailer, a hopper bottom trailer, a lowboy trailer, a refrigeration trailer, a tank container chassis trailer, or a double trailer.

According to various implementations, the cargo trailer 100 can include a set of sensor assemblies that are configured to replace one or more lamp assemblies of the cargo trailer 100. Detailed descriptions of example sensor assemblies are provided below with respect to FIGS. 2A, 2B, and 4. In certain implementations, the cargo trailer 100 can include a forward, upper-side marker sensor assembly 102 that replaces a required forward, upper side marker lamp assembly. Additionally or alternatively, the cargo trailer can include a mid-side marker sensor assembly 108 to replace a mid-side marker lamp assembly (e.g., including a turn signal), and/or a rear-side marker sensor assembly 104 that replaces a rear-side marker lamp assembly.

The cargo trailer 100 can include a rear lighting arrangement 110 comprising one or more brake indication lamps, tail lamps, reverse signaling lamps, or turn signaling lamps. In certain examples, a lower rearward sensor assembly 112 can be configured to replace any of the lamp assemblies that house the aforementioned lamps. In various examples, the cargo trailer 100 can also comprise a rear clearance lighting arrangement 118 that includes any number of tail lamps or brake indication lamps. In certain implementations, the rear clearance lighting arrangement 118 can comprise one or more rear clearance sensor assemblies 116 that replace a corresponding one or more rear clearance lamps in the arrangement 118.

In addition to the sensor assemblies described, any number of additional sensor assemblies may be mounted to or included with the cargo trailer 100. For example, certain cargo trailers may require additional lamp assemblies, such as corner clearance lamps, additional side lamps, license plate lamps, or other rearward facing lamps. Sensor assembly embodiments described herein can be configured to replace any of the lamp assemblies housing these lamps.

Example Self-Driving Semi-Trailer Truck

Figure 1B:
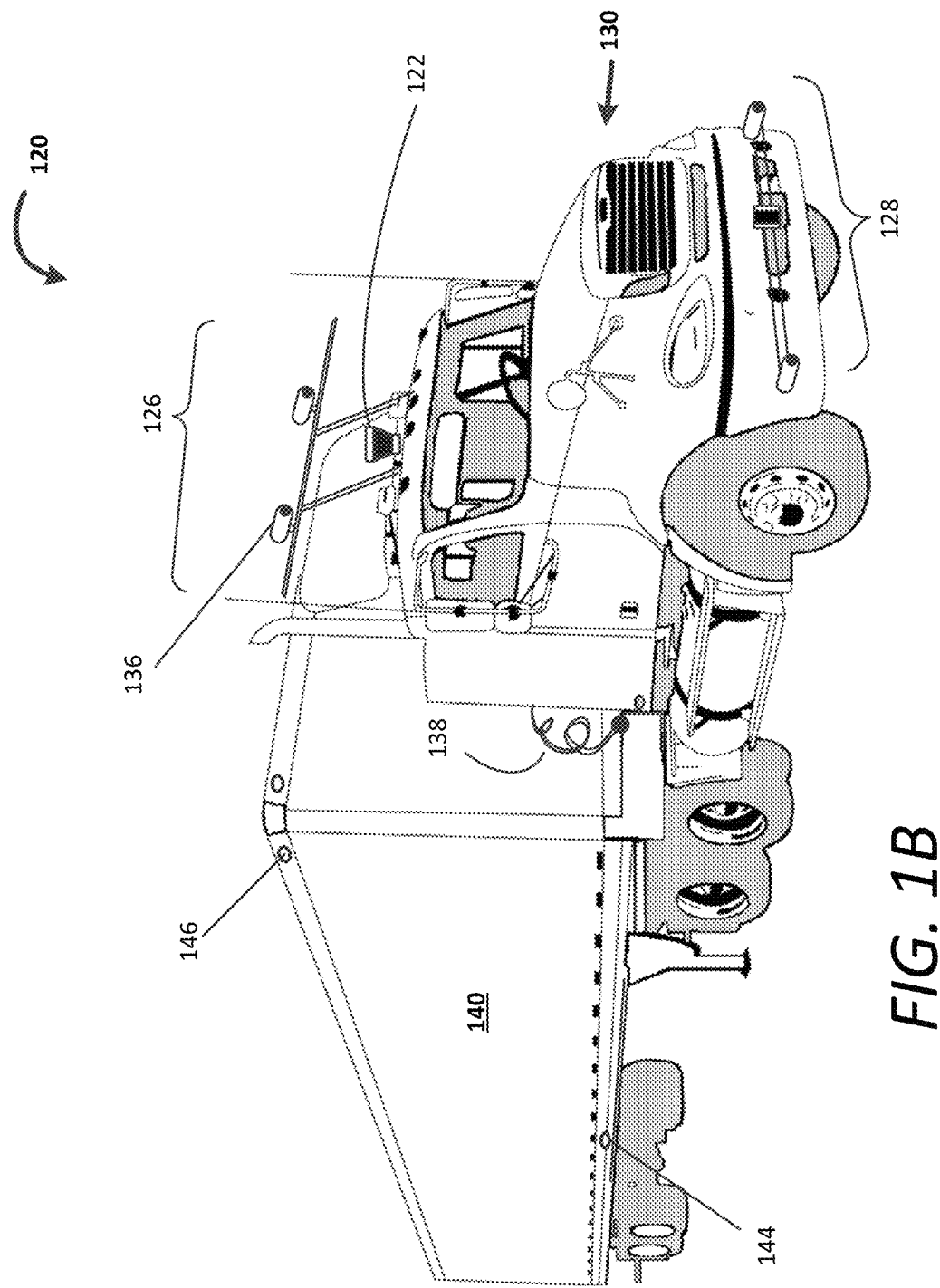
FIG. 1B illustrates a self-driving semi-trailer truck including a self-driving tractor coupled to a cargo trailer, according to examples described herein.

FIG. 1B illustrates a self-driving semi-trailer truck 120 including a self-driving tractor 130 coupled to a cargo trailer 140, according to examples described herein. As shown in FIG. 1B, the self-driving semi-trailer truck 120 can include a self-driving tractor 130 with a cargo trailer 140 having a kingpin coupled to a fifth wheel or trailer hitch of the self-driving tractor 130. The self-driving tractor 130 includes a number of sensor arrays 126, 128 each including any number of sensors and sensor types. For example, sensor array 126 can include a primary LIDAR sensor 122 and a number of additional LIDAR sensors 114, a number of cameras 116, and other sensors, such as a radar system, proximity sensors, infrared sensors, sonar sensors, and the like. The various sensors of the sensor arrays 126, 128 can provide an autonomous control system of the self-driving tractor 130 with a fused sensor view of a surrounding environment of the self-driving semi-trailer truck 120 to enable the control system to autonomously operate the control mechanisms of the self-driving tractor 130, as described in detail below in connection with FIG. 3.

The autonomous control system can receive sensor data from the various sensors of the sensor arrays 126, 128 coupled to the self-driving tractor 130. According to examples described herein, the autonomous control system can also receive sensor data from sensor assemblies 144, 146 coupled to the cargo trailer 140. These sensor assemblies 144, 146 can transmit sensor data wirelessly (e.g., via Bluetooth, Wi-Fi, Zigbee, Infrared, etc.), or through a wired interface via the trailer bus connection 138. The trailer bus connection 138 can electronically couple the self-driving tractor 130 to the cargo trailer 140 to, for example, selectively provide power to the various lighting elements of the cargo trailer 140, such as the tail lights, brake lights, turning signals, reverse light, clearance lights, and the like.

The sensor assemblies 144, 146 can receive power over the trailer bus connection 138 from the tractor 130 to power their lighting elements, sensors, and communication modules. In certain examples, the sensor assemblies 144, 146 can also transmit or stream sensor data via the trailer bus connection 138. In such examples, the connector for the trailer bus connection 138 can comprise a multi-pin connector with a data pin for transmitting the sensor data from the sensor assemblies 144, 146 to the autonomous control system of the self-driving tractor 130.

In various implementations, an individual sensor assembly may be selectively activated at certain times as the self-driving semi-trailer truck 120 operates. For example, the sensor (e.g., a camera or LIDAR sensor) of a side-marker sensor assembly 144 can be selectively activated in concert with a corresponding turn signal light also disposed within the sensor assembly 144. The power signal to activate the turn signal can also trigger the activation of the sensor. Along these lines, when the turn signal is deactivated, the sensor may also deactivate accordingly. Likewise, a rearward facing sensor assembly may be selectively activated when, for example, the self-driving tractor 130 engages the reverse gear, and can be deactivated when the self-driving tractor 130 disengages the reverse gear.

In certain examples, the autonomous control system can selectively activate each sensor assembly 144, 146 when needed. For example, the autonomous control system can do so in order to track and monitor an object or external entity that moves into a former blind spot of the tractor 130. In variations, the sensors of the various sensor assemblies 144, 146 can continuously transmit sensor data to the autonomous control system while operating the control mechanisms of the self-driving tractor 130.

Example Sensor Assemblies

Figure 2A:
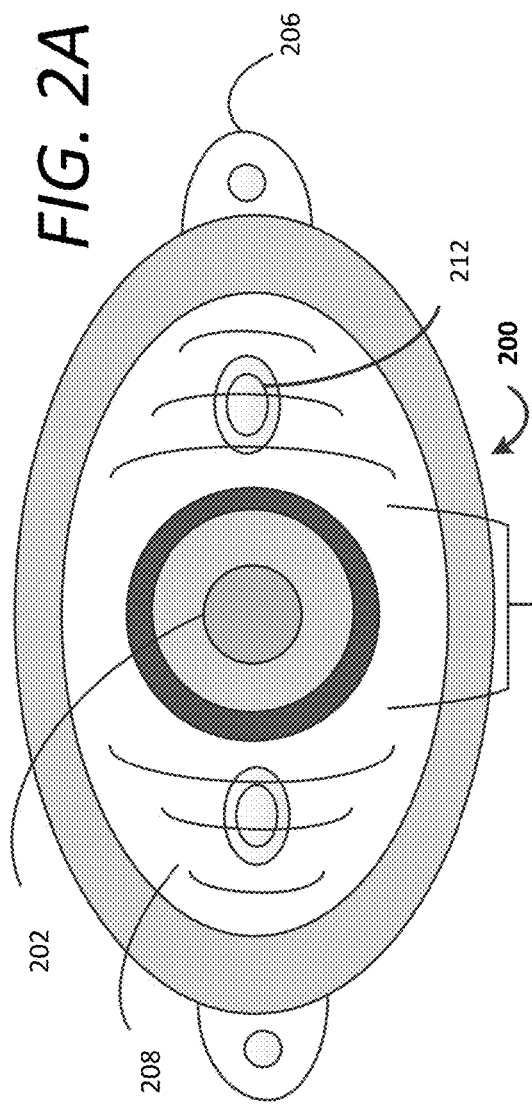
FIG. 2A illustrates a camera sensor assembly, according to various embodiments.
Figure 2B:
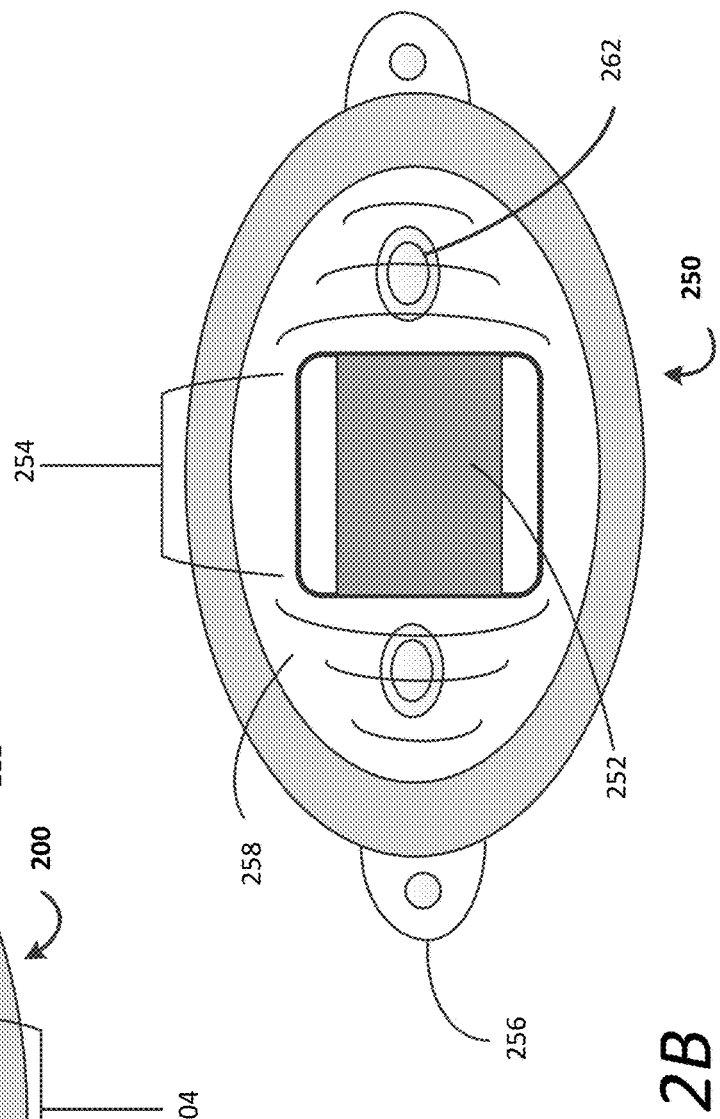
FIG. 2B illustrates a LIDAR sensor assembly, according to various embodiments.

FIGS. 2A and 2B illustrate example sensor assembly embodiments that are mountable or otherwise couplable to the cargo trailer of a self-driving semi-trailer truck. FIG. 2A shows a camera sensor assembly 200 that includes a camera 202 having a field of view through a view pane 204 of the sensor assembly 200. The view pane 204 can comprise an oculus or other suitable opening in a lens 208 of the sensor assembly 200 to provide the camera 202 with an unobstructed view. The camera 202 can provide the autonomous control system of the self-driving tractor with image or video data. The camera sensor assembly 200 can include one or more mounting features 206 to mount the sensor assembly to the cargo trailer. In some aspects, the mounting feature 206 can be configured in a manner to enable the sensor assembly 200 to replace an existing lamp assembly of the cargo trailer.

The sensor assembly 200 can include one or more lighting elements, such as an LED or halogen lamp. The lighting element 212 can transmit light through the lens 208 when selectively illuminated by the autonomous control system of the self-driving tractor. The camera sensor assembly 200 can be configured to replace a directional indicator lamp, a brake lamp, a tail lamp, a reverse lamp, a combination brake and tail lamp, or a clearance indicator lamp assembly. Accordingly, the lighting element 212 can be selectively illuminated based on the self-driving tractor operating at night, indicating a turn or lane change, selecting a reverse gear, and/or braking. In variations, the lighting element 212 can be continuously illuminated while the self-driving truck is being operated.

FIG. 2B illustrates a LIDAR sensor assembly 250, according to various embodiments. As with the camera sensor assembly 200 of FIG. 2A, the LIDAR sensor assembly can also include one or more mounting features 256, a view pane 254, a lens 258, and one or more lighting elements 262. Seated or mounted within the lens cavity, the sensor assembly 250 can include a LIDAR sensor 252. The LIDAR sensor 252 can provide the autonomous control system of the self-driving tractor with LIDAR data corresponding to the field of view provided by the view pane 254. As described herein, the LIDAR data may be transmitted via a wired data bus or wirelessly using a suitable wireless communication standard.

According to various examples, the sensor assemblies 200, 250 of FIGS. 2A and 2B can further include an electronic bus connector to connect to wiring of the cargo trailer. In certain aspects, the electrical connection can supply power to one or more of the lighting elements 212, 262 and the camera 200 and LIDAR sensor 250. Additionally, the electrical connection can further supply power to a controller and communication module (not shown) of the sensor assemblies 200, 250, as described below in connection with FIG. 4.

Example Systems

Figure 3:
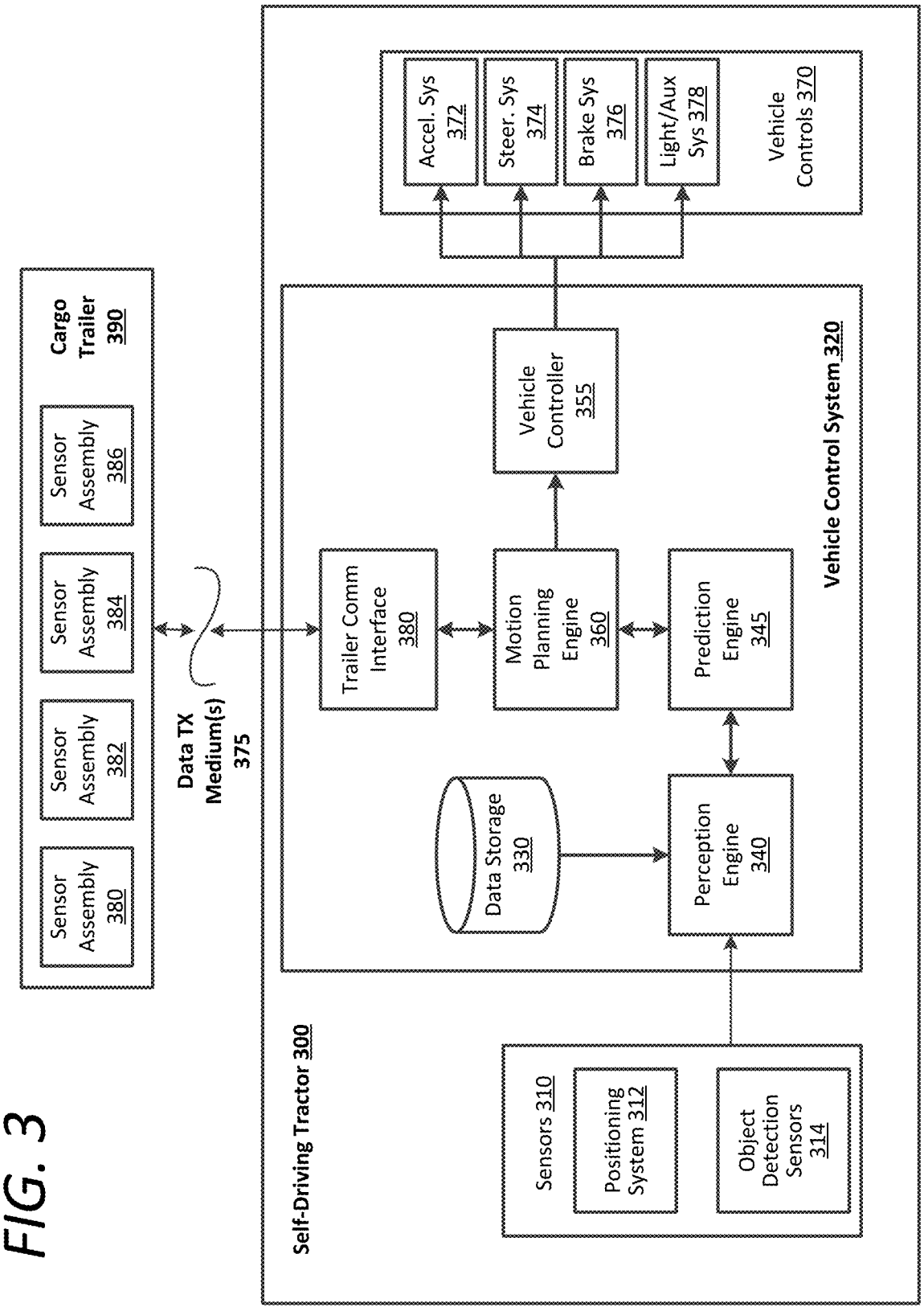
FIG. 3 is a block diagram illustrating a vehicle control system of a self-driving tractor in communication with a number of sensor assemblies of a cargo trailer, according to various embodiments.

FIG. 3 is a block diagram illustrating a vehicle control system of a self-driving tractor in communication with a number of sensor assemblies of a cargo trailer, according to various embodiments. In an example of FIG. 3, a vehicle control system 320 can autonomously operate the self-driving tractor 300 throughout geographic regions for a variety of purposes, including transport services (e.g., on-demand transport, freight and delivery services, etc.). In examples described, the self-driving tractor 300 can operate autonomously without human control. For example, the self-driving tractor 300 can autonomously steer, accelerate, shift, brake, and operate lighting components. Some variations also recognize that the self-driving tractor 300 can switch between an autonomous mode, in which the vehicle control system 320 autonomously operates the tractor 300, and a manual mode in which a qualified driver takes over manual control of the acceleration system 372, steering system 374, braking system 376, and lighting and auxiliary systems 378 (e.g., directional signals and headlights).

According to some examples, the vehicle control system 320 can utilize specific sensor resources 310 to autonomously operate the tractor 300 in a variety of driving environments and conditions. For example, the vehicle control system 320 can operate the tractor 300 by autonomously operating the steering, acceleration, and braking systems 372, 374, 376 of the tractor 300 to a specified destination. The control system 320 can perform low-level vehicle control actions (e.g., braking, steering, accelerating) and high-level route planning using sensor information, as well as other inputs (e.g., transmissions from remote or local human operators, network communication from other vehicles, a freight transport coordination system, etc.).

In an example of FIG. 3, the vehicle control system 320 includes computational resources (e.g., processing cores and/or field programmable gate arrays (FPGAs)) which operate to process sensor data received from the sensors 310 of the tractor 300, which provide a sensor view of a road segment upon which the tractor 300 operates. The sensor data can be processed to determine actions to be performed by the tractor 300 in order for the tractor 300 to continue on a route to the destination, or in accordance with a set of transport instructions received from a remote freight transport coordination service. In some variations, the vehicle control system 320 can include other functionality, such as wireless communication capabilities using a communications module, to send and/or receive wireless communications over one or more networks with one or more remote sources. In controlling the tractor 300, the control system 320 can generate commands to control the various vehicle control mechanisms 370 of the tractor 300, including the acceleration system 372, steering system 374, braking system 376, and auxiliary systems 378 (e.g., lights and directional signals).

The self-driving tractor 300 can be equipped with multiple types of sensors 310 which can combine to provide a computerized perception, or sensor view, of the space and the physical environment surrounding the tractor 300. Likewise, the control system 320 can operate within the tractor 300 to receive sensor data from the sensors 310 and to control the various vehicle controls 370 in order to autonomously operate the tractor 300. For example, the control system 320 can analyze the sensor data to generate low level commands executable by the acceleration system 372, steering system 374, and braking system 376 of the tractor 300. Execution of the commands by the control mechanisms 370 can result in throttle inputs, braking inputs, and steering inputs that collectively cause the tractor 300 to operate along sequential road segments according to a route plan.

In more detail, the sensors 310 operate to collectively obtain a live sensor view for the vehicle control system 320 (e.g., in a forward operational direction, or providing a 360-degree sensor view), and to further obtain situational information proximate to the tractor 300, including any potential hazards or obstacles. By way of example, the sensors 310 can include a positioning system 312, such as a GPS module, and object detection sensors 314. The object detection sensors 314 can be arranged in a sensor suite or sensor arrays mounted to the exterior of the tractor 300, such as on the front bumper and roof. The object detection sensors 314 can comprise multiple sets of cameras (video cameras, stereoscopic cameras or depth perception cameras, long range monocular cameras), LIDAR sensors, one or more radar sensors, and various other sensor resources such as sonar, proximity sensors, infrared sensors, and the like.

In general, the sensors 310 collectively provide sensor data to a perception engine 340 of the vehicle control system 320. The perception engine 340 can access a data storage 330 comprising localization sub-maps of the given region in which the tractor 300 operates. The localization sub-maps can comprise a series of road segment sub-maps that enable the perception engine 340 to perform dynamic comparisons with the live sensor view to perform object detection and classification operations. As provided herein, the localization sub-maps can comprise highly detailed ground truth data of each road segment on which the self-driving tractor 300 can travel. For example, the localization sub-maps can encompass long stretches of highways where perception operations are relatively undemanding compared to a crowded urban environment. The localization sub-maps can comprise prerecorded and fused data (e.g., sensor data including image data, LIDAR data, and the like) by specialized mapping vehicles and/or autonomous vehicles with recording sensors and equipment, and can be processed to pinpoint various objects of interest (e.g., traffic signals, road signs, and other static objects). As the control system 320 autonomously operates the tractor 300 along a given route, the perception engine 340 can access sequential localization sub-maps of current road segments to compare the details of a current localization sub-map with the sensor data in order to detect and classify any objects of interest, such as road debris, other vehicles, pedestrians, bicyclists, and the like.

In various examples, the perception engine 340 can dynamically compare the live sensor data from the tractor's sensors 310 to the current localization sub-map as the tractor 300 travels through a corresponding road or highway segment. The perception engine 340 can identify and classify any objects of interest in the live sensor data that can indicate a potential hazard. In accordance with many examples, the perception engine 340 can provide object of interest data to a prediction engine 345 of the control system 320, where the objects of interest can each be classified (e.g., a pedestrian, a bicyclist, unknown objects, other vehicles, a static object, etc.).

Based on the classification of the detected objects, the prediction engine 345 can predict a path of each object of interest and determine whether the vehicle control system 320 should respond or react accordingly. For example, the prediction engine 345 can dynamically calculate a collision probability for each object of interest based at least in part on its classification, and generate event alerts if the collision probability exceeds a certain threshold. As described herein, such event alerts can be processed by a motion planning engine 360 along with a processed sensor view indicating the classified objects within the live sensor view of the tractor 300. The vehicle controller 355 can then generate control commands executable by the various vehicle controls 370 of the tractor 300, such as the acceleration, steering, and braking systems 372, 374, 376. In certain examples, the motion planning engine 360 can determine an immediate, low level trajectory and/or higher-level plan for the tractor 300 based on the event alerts and processed sensor view (e.g., for the next 100 meters, up to a next intersection, or for a certain distance along a highway).

On a higher level, the motion planning engine 360 can provide the vehicle controller 355 with a route plan to a given destination, such as a pick-up location, a docking and drop off location, or other destination within a given road network. In various aspects, the motion planning engine 360 can generate the route plan based on transport instructions received from a remote freight coordination service (e.g., over a wireless network). On a lower level, the motion planning engine 360 can provide the vehicle controller 355 with an immediate trajectory for the tractor 300 based on the objects of interest, obstacles, and collision probabilities identified and determined by the perception and prediction engines 340, 345. The vehicle controller 355 can generate the appropriate control commands executable by the vehicle controls 370 accordingly.

In various examples, the motion planning engine 360 generates trajectories for the tractor 300 in accordance with a motion planning model. Execution of the motion planning model enables the motion planning engine 360 to safely calculate and/or construct trajectories in accordance with the configuration and capabilities of the cargo trailer 390, such as the maximum turning radius of the tractor 300 given the dimensions of the cargo trailer 390, the dimensions of the tractor 300 and cargo trailer 390 combination (e.g., its overall length, width, and height), and the axle positions of the tractor 300 and cargo trailer 390 (e.g., to determine how wide to take a particular turn to ensure adequate clearance from curbs and objects).

According to examples described herein, the vehicle control system 320 can include a trailer communication interface 380 to communicatively couple the self-driving tractor 300 to the various sensor assemblies 380, 382, 384, 386 of the cargo trailer 390 over one or more data transmission medium(s) 375. Various operations of the control system 320 performed in connection with the sensor assemblies 380, 382, 384, 386 of the cargo trailer 390 are described below with respect to the flow chart of FIG. 6. The data transmission medium(s) 375 can comprise a wireless medium, such as Bluetooth or Wi-Fi, in which communications modules of the sensor assemblies 380, 382, 384, 386 can transmit sensor data to the trailer communication interface 380. In such examples, the trailer communication interface 380 can also include wireless communication capabilities to transmit and or receive the sensor data. In certain examples, the data transmission medium(s) 375 can include a wired communication bus and connector (e.g., a round pin connector). In such examples, the sensor assemblies 380, 382, 384, 386 can transmit sensor data to the trailer communication interface 380 through the wired communication bus (e.g., via a dedicated data bus and connector pin).

The sensor data from the sensor assemblies 380, 382, 384, 386 can be processed by the motion planning engine 360 to detect and monitor objects of interest that would otherwise be in a blind spot of the self-driving tractor 300. For example, during low speed maneuvering, sensor data from the sensor assemblies 380, 382, 384, 386 of the cargo trailer 390 can indicate nearby pedestrians, vehicles, and objects proximate to the cargo trailer 390, but otherwise undetected by the sensors 310 of the self-driving tractor 300. In some aspects, the sensor data from the sensor assemblies 380, 382, 384, 386 can be processed by the perception engine 340 and the prediction engine 345 to perform object detection, classification, and dynamic path prediction and collision probability calculations, as described herein. Based on the sensor data received via the data transmission medium(s) 375, the motion planning engine 360 can generate control actions that cause the vehicle controller 355 to safely operate the vehicle controls 370 such that adequate clearances between the cargo trailer 390 and any proximate objects or entities are ensured, and any potential collisions are avoided.

In certain implementations, the vehicle control system 320 can selectively activate individual sensor assemblies 380, 382, 384, 386 of the cargo trailer 390. For example, sensor assembly 382 may be side-mounted to the cargo trailer, and during normal operation, can provide redundant and/or unnecessary sensor data to the vehicle control system 320 (e.g., from a sensor assembly monitoring a field of view that is detectable by an object detection sensor 314 of the self-driving tractor 300). However, as an example, when the self-driving tractor 300 executes a turn, the respective fields of view of the sensors change in orientation between the cargo trailer 390 and the self-driving tractor 300. Accordingly, the vehicle control system 320 can selectively activate the sensor assembly 382 prior to and during the performance of a particular maneuver, such as a lane change or a turn.

Furthermore, even though certain areas may be visible by a sensor 310 of the self-driving tractor 300, a sensor assembly of the cargo trailer has a different perspective that can provide additional context to an object present within that area. For example, a sensor 310 of the self-driving tractor 300 may identify a vehicle to the side of the cargo trailer 390, but the side-mounted sensor assembly 382 may detect additional objects behind the vehicle, which the vehicle is blocking from the perspective of the first sensor 310. As another example, a sensor assembly 386 mounted to the upper exterior wall of the cargo trailer can provide greater context to the overall traffic environment surrounding the self-driving semi-trailer truck, allowing for motion planning engine 360 to make more robust motion plans and potentially execute safer trajectories than with a purely local sensor view from the sensors 310 of the self-driving tractor 300.

According to examples described herein, the vehicle control system 320 can selectively activate any individual sensor assembly 380, 382, 384, 386 based on any number of triggering conditions or parameters. Such triggering conditions or parameters can include a speed threshold being crossed (e.g., activating all sensor assemblies 380, 382, 384, 386 when the tractor 300 drops below ten miles per hour). The triggering conditions or parameters may be weather or visibility related, such as when there is precipitation, fog, or during nighttime driving conditions. The triggering conditions or parameters may be maneuver-based, where activation of certain sensor assemblies 380, 382, 384, 386 occurs prior to and during execution of a lane change, a turn, a docking procedure, or a reversing maneuver. In certain implementations, the vehicle control system 320 can activate certain side-mounted sensor assemblies of the cargo trailer 390 in concert with activating a corresponding turn signal when making a turn or lane change. Additionally or alternatively, the vehicle control system 320 can cause one or more rear-facing sensor assemblies of the cargo trailer 390 to either be continuously activated, or selectively activated based on a reversing maneuver to be performed or the vehicle controller 355 selecting the reverse gear.

In various examples, the vehicle control system 320 can transmit a sensor activation signal to a selected sensor assembly of the cargo trailer 390 to activate the sensor and receive sensor data from that sensor assembly. In certain implementations, the sensor assemblies 380, 382, 384, 386 can receive power signals from a bus connector between the self-driving tractor 300 and the cargo trailer 390 to power the various components of the sensor assemblies 380, 382, 384, 386. Additionally or alternatively, the sensor assemblies 380, 382, 384, 386 can each include a power source that can be independently charged, or charged automatically (e.g., via solar power).

Figure 4:
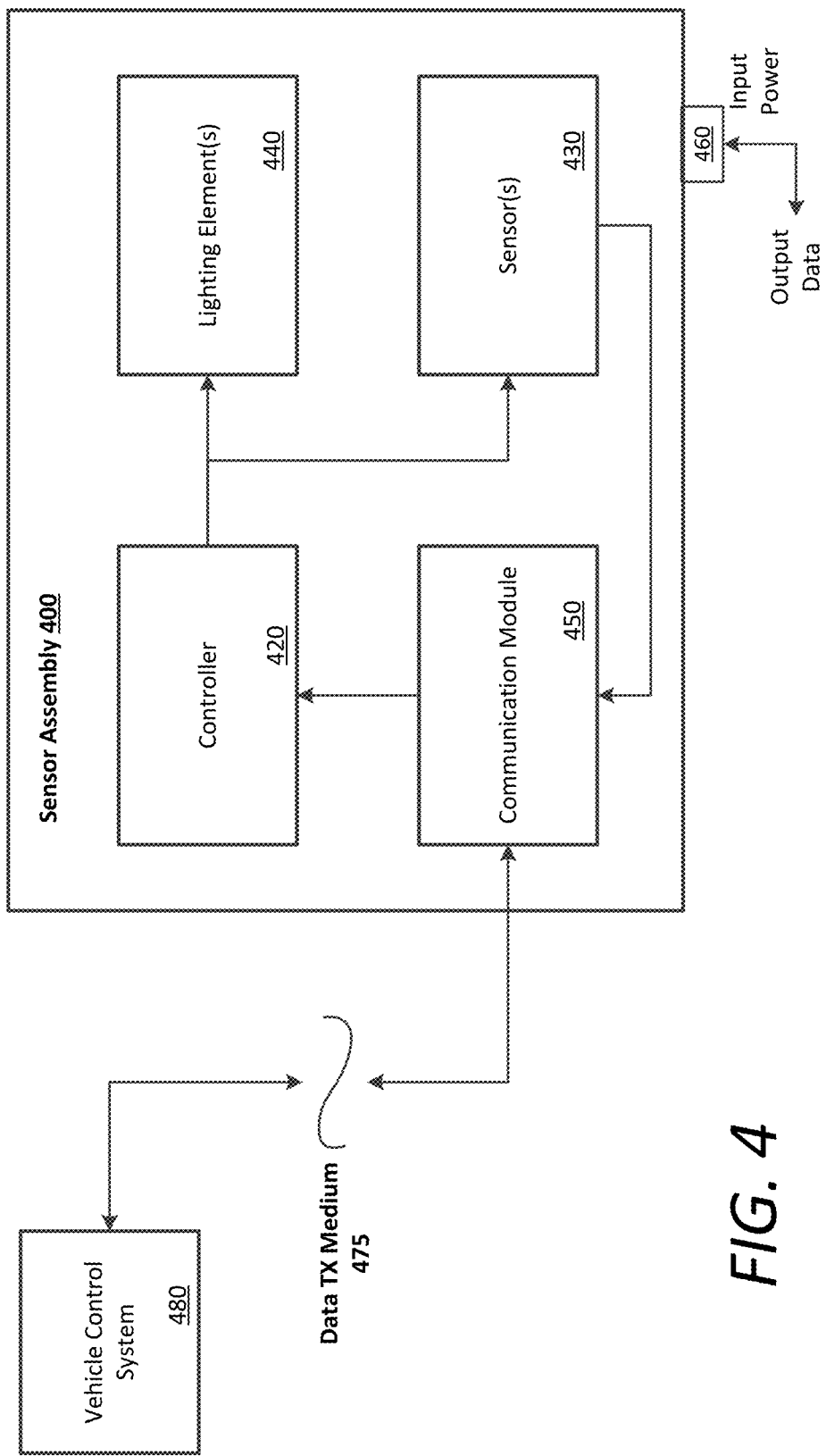
FIG. 4 is a block diagram illustrating a sensor assembly in communication with a vehicle control system of a self-driving tractor, according to various embodiments.

FIG. 4 is a block diagram illustrating a sensor assembly 400 in communication with a vehicle control system 480 of a self-driving tractor, according to various embodiments. As described herein, the sensor assembly 400 may have a combined electronic and data communication connection (e.g., a wired connection 460) or a separate wired electronic connection 460 and wireless data communication connection as data transmission mediums 475 with the vehicle control system 480. The sensor assembly 400 of FIG. 4 can correspond to the sensor assemblies 200, 250 described in connection with FIGS. 2A and 2B, and can include mounting features, lenses, and view panes such as those described herein. In various examples, the sensor assembly 400 can include one or more sensors 430, which can comprise a LIDAR sensor or a camera (e.g., a monocular or stereoscopic camera). In variations, the sensor(s) 430 can comprise a proximity sensor, a radar sensor, an infrared sensor, a sonar sensor, etc. The sensor assembly can further include one or more lighting elements 440 (e.g., an LED or halogen bulb).

In certain examples, the sensor assembly 400 can include a communication module 450. The communication module 450 can comprise wireless communications resources (e.g., one or more antennas and a Bluetooth or Wi-Fi chipset and microcontroller) to communicate with the vehicle control system 480 over the wireless transmission medium 475. In some aspects, the communication module 450 can perform one-way communications, transmitting or otherwise streaming sensor data from the sensor(s) 430 to the vehicle control system 480. In variations, the communication module 450 can perform two-way communications, receiving sensor activation signals from the vehicle control system 480, and transmitting sensor data in response.

The sensor assembly 400 can further comprise a controller 420 that processes activation signals from the vehicle control system 480 to activate the lighting element(s) 440 and sensor(s) 430 selectively, separately, and/or in concert. Various operations performed by the controller 420 are described below in connection with the flow chart shown in FIG. 5. The controller 420 can receive activation signals from the vehicle control system 480 and selectively activate at least one of the lighting elements 440 and the sensor 430. For example, the activation signal can comprise a lamp activation signal (e.g., corresponding to the tractor braking). Based on the lamp activation signal, the controller 420 can illuminate the lighting element(s) 440 (e.g., to illuminate the brake lights of the cargo trailer. As another example, the lighting element(s) 440 can comprise a turn signal, reverse light, tail light, or clearance light, and the lamp activation signal can be received based on the tractor initiating a turn or lane change, performing a reversing maneuver, and/or operating in general or specifically at night respectively.

In certain variations, the controller 420 can further receive sensor activation signals, and activate the sensor(s) 430 in response. As described herein, the sensor activation signals can be received from the vehicle control system 480 based on any number of triggering conditions or parameters, such as a speed threshold being crossed, a gear being selected, a lane change or turn being executed, certain weather conditions, road conditions, environmental conditions (e.g., when the truck is in a crowded urban environment), or a maneuver to be performed (e.g., a three-point turn or docking maneuver). Along these lines, the controller 420 can selectively deactivate the sensor(s) 430 once the triggering parameters or conditions have lapsed.

In some aspects, the sensor assembly 400 can include a wired connection 460 that connects the sensor assembly 400 to the existing wiring of the cargo trailer. For example, the sensor assembly 400 can be configured to replace an existing lamp assembly of the cargo trailer. Accordingly, in certain examples, the wired connection 460 can receive input power from the tractor via a bus connector (e.g., an industry standard, round pin connector). The controller 420 can utilize the input power from the wired connection 460 to selectively activate the lighting element(s) 440, the wireless communication module 450, and/or the sensor(s) 430.

In variations, the wired connection 460 can include a data bus through which the controller 420 can output sensor data to the vehicle control system 480. In such variations, a wireless communication module 450 need not be included as a component of the sensor assembly 400. Furthermore, in such variations, the cargo trailer wiring may be updated to include the data bus from the sensor assembly 400 to the bus connector between the cargo trailer and the self-driving tractor. In various aspects, this bus connector can include at least one dedicated pin for sensor data transmission from the sensor assemblies 400 distributed on the cargo trailer.

Methodology

Figure 5:
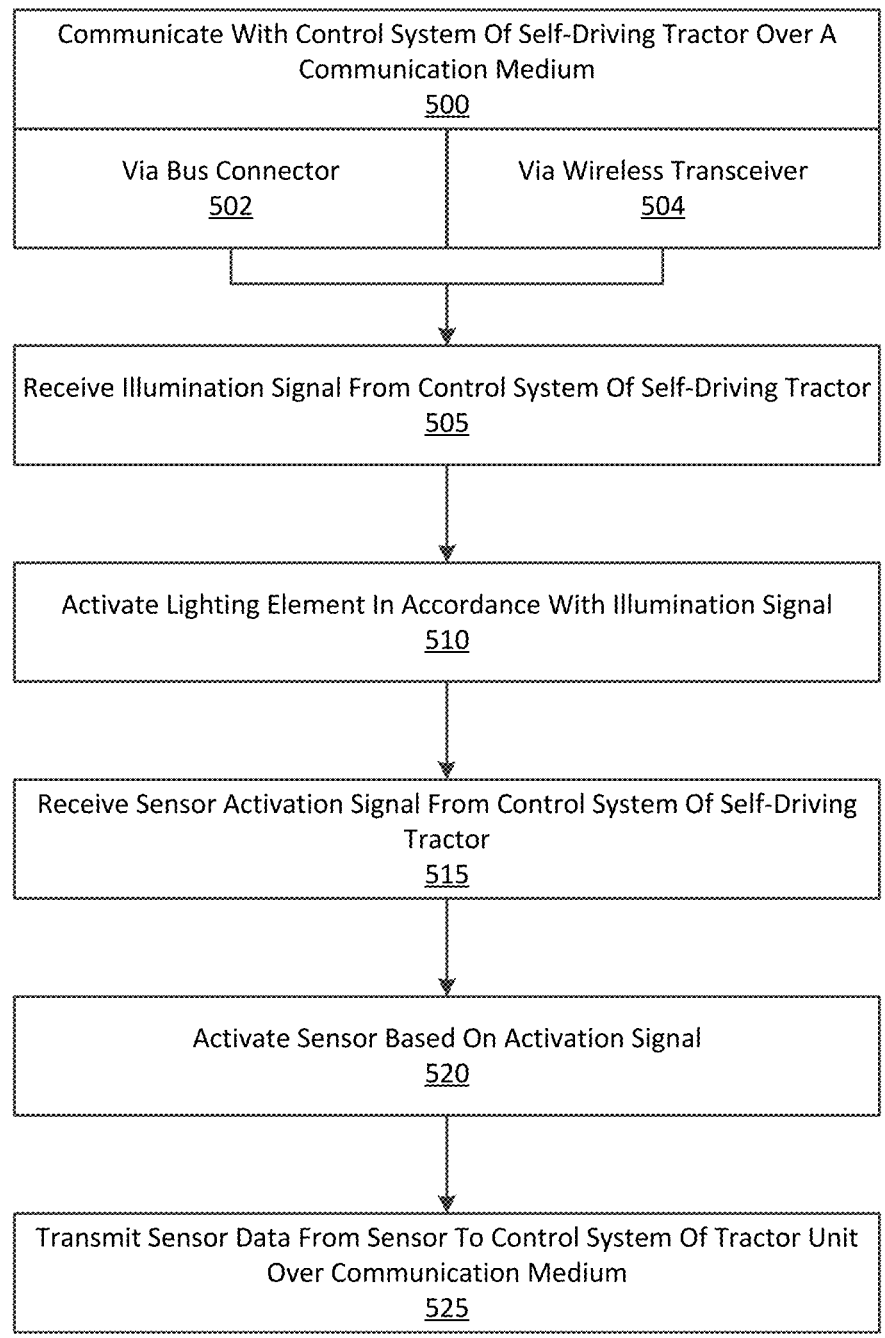
FIG. 5 is a flow chart describing a method of operating a sensor assembly for a cargo trailer, according to embodiments described herein.

FIG. 5 is a flow chart describing a method of operating a sensor assembly for a cargo trailer, according to embodiments described herein. In the below description of FIG. 5, reference may be made to reference characters representing like features as shown and described with respect to FIGS. 1A through 4. Furthermore, the processes described with respect to FIG. 5 may be performed by an example controller of the sensor assembly 400 as shown and described with respect to FIG. 4. Referring to FIG. 5, the controller 420 of the sensor assembly 400 can communication with the control system 320 of a self-driving tractor 300 over a communication medium 375 (500). In some aspects, the communication medium 375 can comprise a wired bus connector (502). Additionally or alternatively, the communication medium 375 can comprise a wireless transceiver (504).

In accordance with various embodiments, the controller 420 can receive illumination signals from the control system 320 of the self-driving tractor 300 (505). In accordance with the illumination signal, the controller 420 can activate one or more lighting element(s) 440 of the sensor assembly 400 (510). The controller 420 can also receive a sensor activation signal from the control system 320 of the self-driving tractor 300 (515). Based on the sensor activation signal, the controller 320 can activate the sensor 430 of the sensor assembly (520), and transmit sensor data from the sensor 430 to the vehicle control system 320 of the tractor 300. As described herein, the sensor data may be transmitted wirelessly using a suitable wireless communication protocol, or via a wired data bus through the bus connector with the self-driving tractor 300.

Figure 6:
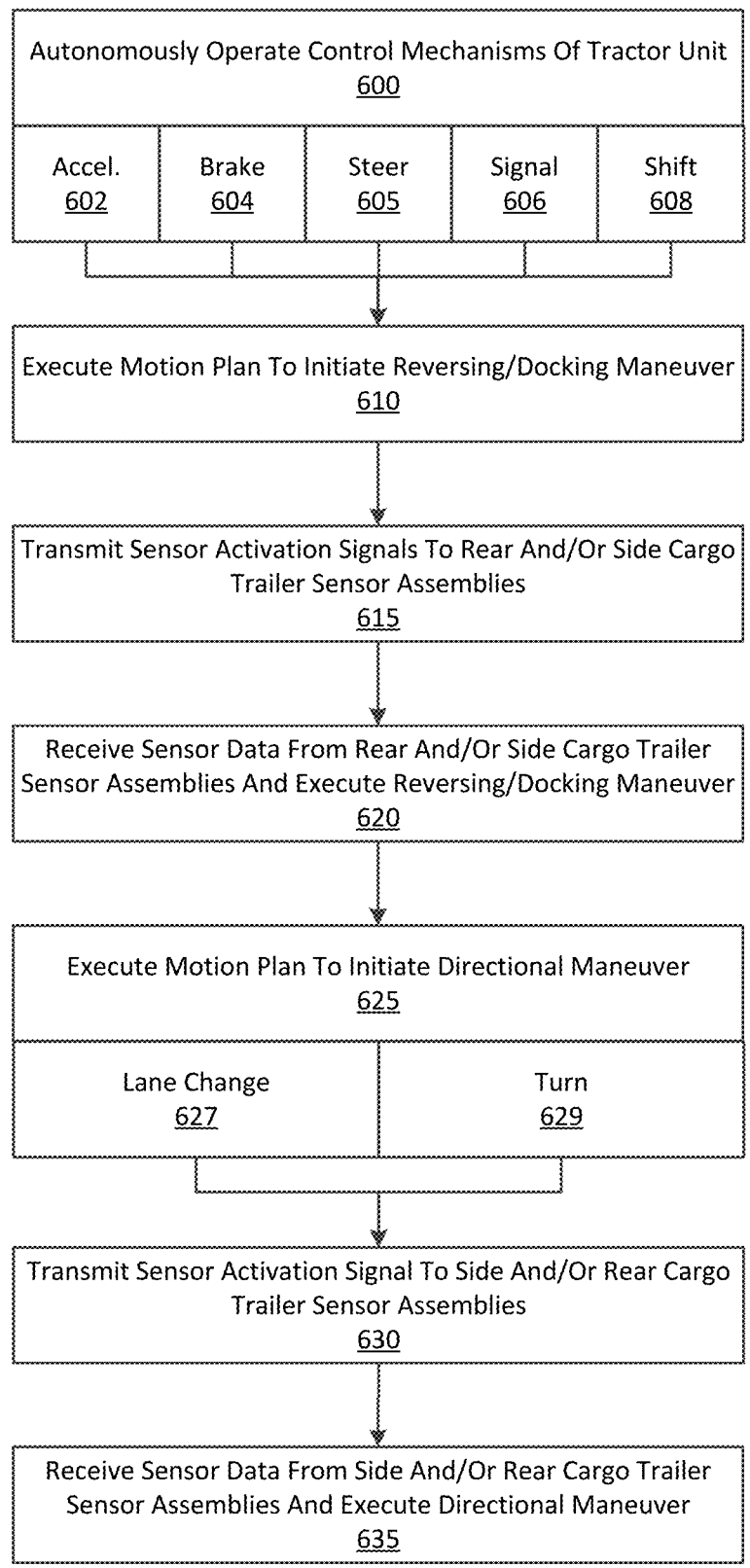
FIG. 6 is a flow chart describing a method of autonomously operating a self-driving tractor using a set of sensor assemblies of a coupled cargo trailer, according to embodiments described herein.

FIG. 6 is a flow chart describing a method of autonomously operating a self-driving tractor 300 using a set of sensor assemblies of a coupled cargo trailer, according to embodiments described herein. In the below description of FIG. 6, reference may also be made to reference characters representing like features as shown and described with respect to FIGS. 1A through 4. Furthermore, the processes described with respect to FIG. 6 may be performed by an example vehicle control system 320 of a self-driving tractor 300, as shown and described with respect to FIG. 3. Referring to FIG. 6, the vehicle control system 320 can autonomously operate the vehicle control mechanisms 370 of the self-driving tractor 300 (600). In various aspects, the vehicle control system 320 can autonomously operate the acceleration system (602), braking system (604), steering system (605), signaling system (e.g., headlights, tail lights, brake lights, turn signals, clearance lights, etc.) (606), and shifting system (608).

In various examples, the vehicle control system 320 can execute a motion plan to initiate a reverse and/or docking maneuver (610). The vehicle control system 320 can selectively generate and transmit a sensor activation signal to one or more rear and or side cargo trailer sensor assemblies 380, 382, 384, 386 accordingly (615). Based on the sensor activation signal, the vehicle control system 320 can receive sensor data from the selected rear and/or side cargo trailer sensor assemblies 380, 382, 384, 386 and execute the reversing and/or dicking maneuver (620).

According to certain implementations, the vehicle control system 320 can execute a motion plan to initiate a directional maneuver (625), such as a lane change (627) or a turn (629). The vehicle control system 320 may then selectively generate and transmit a sensor activation signal to one or more side and/or rear cargo trailer sensor assemblies 380, 382, 384, 386 to activate the selected sensors (630). Thereafter, the vehicle control system 320 can receive sensor data from the side and/or rear cargo trailer sensor assemblies 380, 382, 384, 386 and execute the directional maneuver (625).

In various examples, the vehicle control system 320 can cause the sensor assemblies 380, 382, 384, 386 to be continuously or selectively activated based on a set of triggering conditions or parameters, as described herein. Furthermore, the embodiments described herein need not be limited to any particular sensor or triggering conditions.

Example Hardware Diagram

Figure 7:
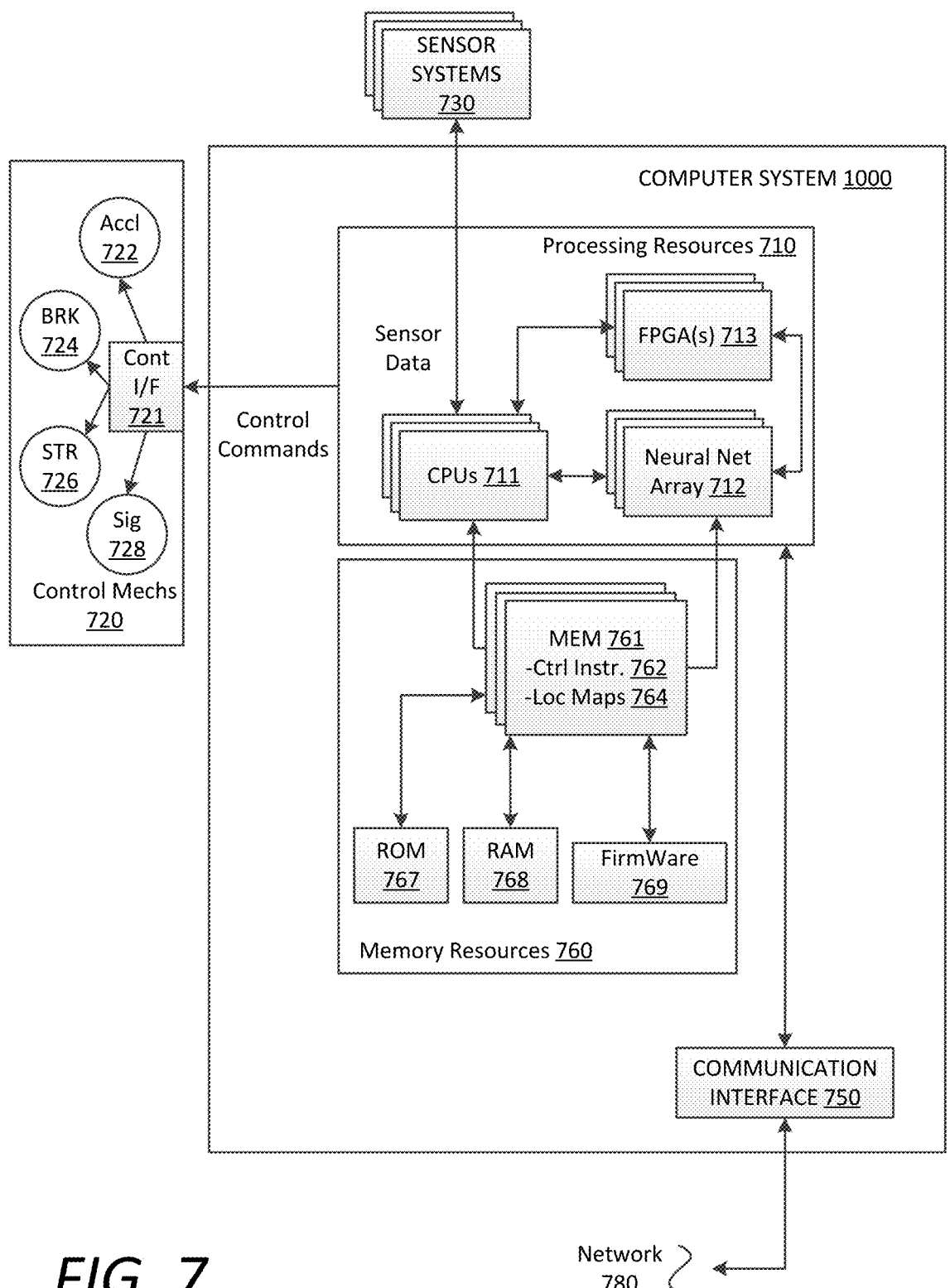
FIG. 7 is a block diagram illustrating a computer system upon which example processing systems of a self-driving tractor unit described herein may be implemented.

FIG. 7 is a block diagram illustrating a computer system upon which example processing systems of a self-driving tractor described herein may be implemented. The computer system 700 can be implemented using a number of processing resources 710, which can comprise computer processing (CPUs) 711 and field programmable gate arrays (FPGAs) 713. In some aspects, any number of processors 711 and/or FPGAs 713 of the computer system 700 can be utilized as components of a neural network array 712 implementing a machine learning model and utilizing road network maps stored in memory 761 of the computer system 700. In the context of FIG. 3, various aspects and components of the control system 320 can be implemented using one or more components of the computer system 700 shown in FIG. 7.

According to some examples, the computer system 700 may be implemented within a self-driving tractor with software and hardware resources such as described with examples of FIGS. 2 and 3. In an example shown, the computer system 700 can be distributed spatially into various regions of the self-driving tractor, with various aspects integrated with other components of the tractor itself. For example, the processing resources 710 and/or memory resources 760 can be provided in a cargo space of the self-driving tractor. The various processing resources 710 of the computer system 700 can also execute control instructions 762 using microprocessors 711, FPGAs 713, a neural network array 712, or any combination of the foregoing.

In an example of FIG. 7, the computer system 700 can include a communication interface 750 that can enable communications over a network 780. In one implementation, the communication interface 750 can also provide a data bus or other local links to electro-mechanical interfaces of the vehicle, such as wireless or wired links to and from control mechanisms 720 (e.g., via a control interface 721), sensor systems 730, and can further provide a network link to a backend transport management system or a remote teleassistance system (implemented on one or more datacenters) over one or more networks 780.

The memory resources 760 can include, for example, main memory 761, a read-only memory (ROM) 767, storage device, and cache resources. The main memory 761 of memory resources 760 can include random access memory (RAM) 768 or other dynamic storage device, for storing information and instructions which are executable by the processing resources 710 of the computer system 700. The processing resources 710 can execute instructions for processing information stored with the main memory 761 of the memory resources 760. The main memory 761 can also store temporary variables or other intermediate information which can be used during execution of instructions by the processing resources 710. The memory resources 760 can also include ROM 767 or other static storage device for storing static information and instructions for the processing resources 710. The memory resources 760 can also include other forms of memory devices and components, such as a magnetic disk or optical disk, for purpose of storing information and instructions for use by the processing resources 710. The computer system 700 can further be implemented using any combination of volatile and/or non-volatile memory, such as flash memory, PROM, EPROM, EEPROM (e.g., storing firmware 769), DRAM, cache resources, hard disk drives, and/or solid state drives.

The memory 761 may also store localization maps 764 in which the processing resources 710—executing control instructions 762—continuously compare to sensor data from the various sensor systems 730 of the self-driving tractor. Execution of the control instructions 762 can cause the processing resources 710 to generate control commands in order to autonomously operate the tractor's acceleration 722, braking 724, steering 726, and signaling systems 728 (collectively, the control mechanisms 720). Thus, in executing the control instructions 762, the processing resources 710 can receive sensor data from the sensor systems 730, dynamically compare the sensor data to a current localization map 764, and generate control commands for operative control over the acceleration, steering, and braking of the AV along a particular route plan. The processing resources 710 may then transmit the control commands to one or more control interfaces 721 of the control mechanisms 720 to autonomously operate the self-driving tractor along an autonomy route.

While examples of FIG. 7 provide for computing systems for implementing aspects described, some or all of the functionality described with respect to one computing system of FIG. 7 may be performed by other computing systems described with respect to FIG. 7.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An autonomous vehicle, comprising: a plurality of sensor assemblies positioned at different locations on the autonomous vehicle, the plurality, of sensor assemblies respectively comprising: a housing including a view pane; and a sensor mounted within the housing and having a field of view through the view pane of the housing; and a control system configured to: receive sensor data from the sensors of the plurality of sensor assemblies; identify a first triggering condition and a second triggering condition during operation of the autonomous vehicle; generate a first sensor activation signal identifying a first set of one or more sensors selected from the plurality of sensor assemblies for activating in response to the first triggering condition; generate a second sensor activation signal identifying a second set of one or more sensors selected from the plurality of sensor assemblies for activating in response to the second triggering condition, actuate the first set of one or more sensors based at least in part on the first sensor activation signal; and actuate the second set of one or more sensors based at least in part on the second sensor activation signal.

2. The autonomous vehicle of claim 1, wherein at least one the first triggering condition or the second triggering condition comprises crossing a speed threshold of the autonomous vehicle.

3. The autonomous vehicle of claim 1, wherein at least one of the first triggering condition or the second triggering condition comprises a driving condition comprising at least one of precipitation, fog, or nighttime.

4. The autonomous vehicle of claim 1, wherein at least one of the first triggering condition or the second triggering condition comprises a maneuver-based condition comprising at least one of a lane change, a turn, a docking procedure, or a reversing maneuver.

5. The autonomous vehicle of claim 1, the control system configured to:
generate a first sensor deactivation signal configured to deactivate the first set of one or more sensors once the first triggering condition has lapsed; and
generate a second sensor deactivation signal configured to deactivate the second set of one or more sensors once the second triggering condition has lapsed.

6. The autonomous vehicle of claim 1, the plurality of sensor assemblies respectively comprising a lighting element mounted within the housing to selectively generate light.

7. The autonomous vehicle of claim 6, the control system configured to generate an illumination signal identifying one or more lighting elements selected from the plurality of sensor assemblies for activating in response to the illumination signal.

8. The autonomous vehicle of claim 7, wherein the illumination signal is configured to:
actuate lighting elements associated with the first set of one or more sensors in response to the first triggering condition; and
actuate lighting elements associated with the second set of one or more sensors in response to the second triggering condition.

9. The autonomous vehicle of claim 1, wherein:
the autonomous vehicle comprises a self-driving tractor coupled to a cargo trailer; and
the plurality of sensor assemblies are positioned at different locations on at least one of the self-driving tractor or the cargo trailer.

10. The autonomous vehicle of claim 9, wherein one or more of the plurality of sensor assemblies are configured to replace a lamp assembly of the cargo trailer.

11. The autonomous vehicle of claim 1, wherein the sensor in one or more of the plurality of sensor assemblies comprises at least one of a monocular camera, a stereo camera, or a LIDAR sensor.

12. A sensor assembly, comprising:
a housing including a view pane;
a lighting element positioned within the housing to generate light;
a sensor positioned within the housing and having a field of view through the view pane of the housing; and
a controller configured to:
receive a first sensor activation signal and a first illumination signal in response to identification of a first triggering condition during operation of a vehicle including the sensor assembly and, in response to receiving the first sensor activation signal and the first illumination signal, activate the lighting element and the sensor; and
receive a second sensor activation signal and a second illumination signal in response to identification of a second triggering condition during operation of the vehicle including the sensor assembly and, in response to receiving the second sensor activation signal and the second illumination signal, activate the lighting element and the sensor.

13. The sensor assembly of claim 12, the controller configured to:
   receive a first deactivation signal indicative of the first triggering condition having lapsed, and, in response to receipt of the first deactivation signal, deactivate the lighting element and the sensor; and
   receive a second deactivation signal indicative of the second triggering condition having lapsed, and, in response to receipt of the second deactivation signal, deactivate the lighting element and the sensor.

14. The sensor assembly of claim 12, wherein the sensor assembly is mounted to an exterior position of a self-driving tractor and cargo trailer.

15. The sensor assembly of claim 14, wherein the sensor assembly is configured to replace a lamp assembly of the cargo trailer.

16. The sensor assembly of claim 12, wherein the sensor of the sensor assembly comprises at least one of a monocular camera or a stereo camera.

17. The sensor assembly of claim 12, wherein the sensor of the sensor assembly comprises a LIDAR sensor.

18. The sensor assembly of claim 12, wherein at least one of the first triggering condition or the second triggering condition comprises a driving condition of the vehicle comprising at least one of precipitation, fog, or nighttime.

19. The sensor assembly of claim 12, wherein at least one of the first triggering condition or the second triggering condition comprises at least one of a speed threshold being crossed, a lane change, a turn, a docking procedure, or a reversing maneuver.

20. A computer-implemented method of controlling multiple sensors respectively included within a set of multiple sensor assemblies positioned at different locations on an autonomous vehicle, comprising:
   identifying a first triggering condition and a second triggering condition during operation of the autonomous vehicle, wherein the first triggering condition is different than the second triggering condition;
   generating a first sensor activation signal identifying a first set of one or more sensors selected from the multiple sensors for activating in response to the first triggering condition;
   generating a second sensor activation signal identifying a second set of one or more sensors selected from the multiple sensors for activating in response to the second triggering condition;
   actuating the first set of one or more sensors based at least in part on the first sensor activation signal; and
   actuating the second set of one or more sensors based at least in part on the second sensor activation signal.

* * * * *